Feb. 24, 1931.     W. H. SMITH     1,794,211
BRAKE AND LIKE OPERATING MECHANISM
Filed Nov. 13, 1928     3 Sheets-Sheet 1

INVENTOR:
William Heasfield Smith
BY: Reeg, Boyer & Bakelar
ATTORNEYS

Feb. 24, 1931. W. H. SMITH 1,794,211
BRAKE AND LIKE OPERATING MECHANISM
Filed Nov. 13, 1928 3 Sheets-Sheet 2

INVENTOR.
William Hegrfield Smith
BY: *signature*
ATTORNEYS.

Feb. 24, 1931.    W. H. SMITH    1,794,211
BRAKE AND LIKE OPERATING MECHANISM
Filed Nov. 13, 1928    3 Sheets-Sheet 3
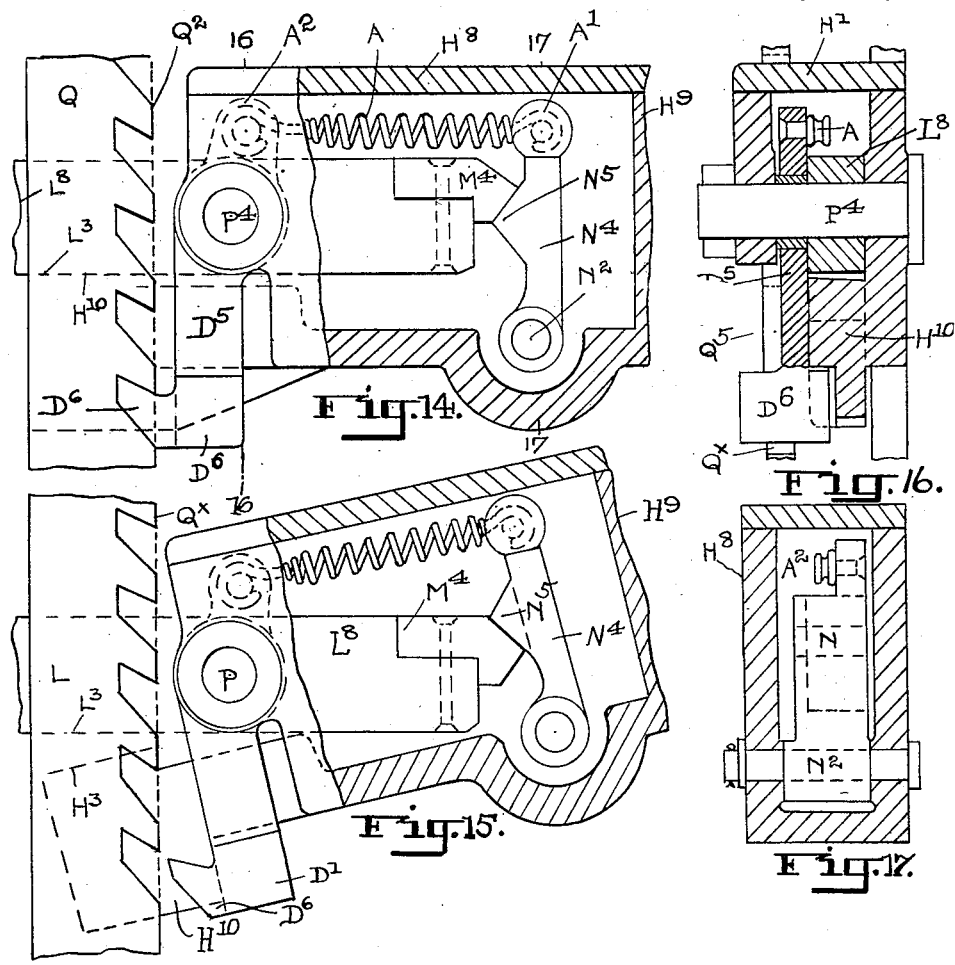

Patented Feb. 24, 1931

1,794,211

UNITED STATES PATENT OFFICE

WILLIAM HEARFIELD SMITH, OF BINGLEY, ENGLAND

BRAKE AND LIKE OPERATING MECHANISM

Application filed November 13, 1928, Serial No. 319,148, and in Great Britain February 28, 1928.

This invention relates to improvements in brake or like operating mechanism.

In applying brakes or the like on vehicles it is customary to employ a lever with which is incorporated a catch relieving mechanism in the nature of an additional lever, or a button, the additional lever being pressed towards the main lever by the operator, and in the other case the button being pressed downwards by the thumb or the like, in any case when the brake is on and it is desired to release same additional pressure has to be applied in order to ease the catch relieving mechanism.

It is my object to arrange and construct a brake or the like applying mechanism in such wise that the desired pressure is obtained by a movement of the operating lever in one direction and the pressure is released by the reverse movement of the lever without necessitating the use of the catch relieving mechanism, and further wear and tear on the rack with which the lever cooperates is reduced to a minimum.

My invention is in the nature of what I may term a two part lever, one part connecting to the shaft or like, which it is desired to actuate and mounted free to move around or in juxtaposition to a suitable or usual racked segment. The other and handle part is pivotally connected to the first part with a restricted motion in relation to the first part, the degree of such motion being regulated by the cooperation of an adjustable member carried by one part with a spring pressed member carried by the other part. The handle part of the lever will generally carry a spring plunger to engage or to be free from the rack, depending on the relative positions of the two parts.

Means may be provided to give a lock when the brake is "on", that is to say, the two part lever may be locked as one part.

In the drawings accompanying this specification,

Figure 1:
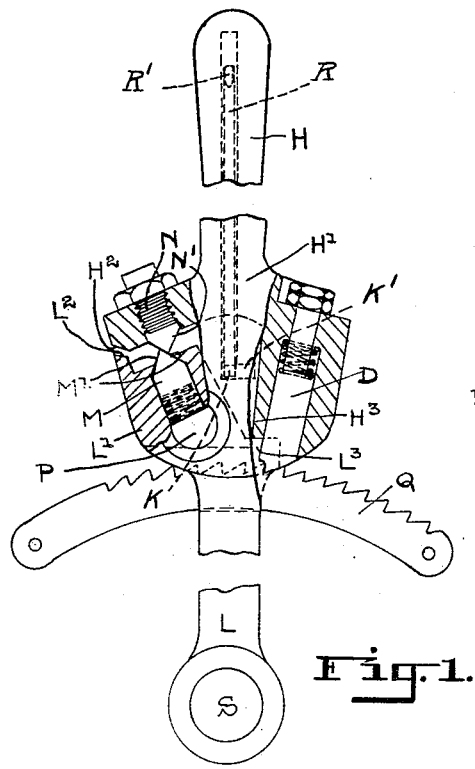
Fig. 1 is a broken away and partly sectional side view of a brake operating mechanism embodying the features of the present invention.

Figs. 14 and 15 are broken away sectional side views of a mechanism embodying my invention and adapted for use in connection with railroad cars, these figures showing the mechanism in the "on" and "off" positions respectively; and Figs. 16 and 17 are transverse sectional views taken respectively on lines 16—16 and 17—17 of Fig. 14.

To carry my invention into effect the mechanism, as hereinafter described, will vary somewhat depending on the type of brake to which it is to be applied, and I have hereinafter described and shown in the drawings, various arrangements as applied to the brakes of different makes of motor road vehicles and to railway wagons. I wish it to be understood that the examples shown are not the only adaptations possible with my invention, which may be used to operate other devices than the brakes mentioned. All so long as it is characterized by a two part lever with a restricted motion between the two parts which obviates the necessity of a hand operated catch relieving mechanism of the usual type, and which reduces wear and tear on the teeth of the usual rack and on the catch operating in connection therewith.

Figures 2, 3:
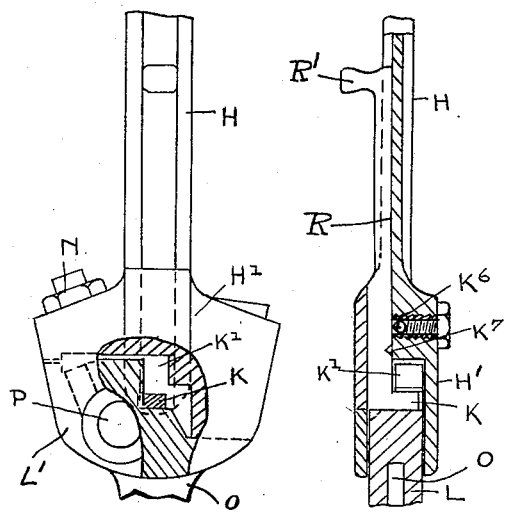
Fig. 2 is a partly sectional side view of the upper portion of the mechanism shown in Fig. 1 and illustrating the mechanism provided with means for locking it in the "on" position of the brake.
Fig. 3 is a vertical sectional view taken centrally through Fig. 2.

Referring first to Figs. 1 to 3 of the drawings, S designates a brake shaft of the usual or any suitable type, to which is secured the lower part L of a two-part lever, the upper or handle part of which is designated H. A quadrant Q provided with rack teeth on its upper side passes through an opening O in the lever part L and is adapted to be secured at its opposite ends to fixed points on the vehicle to be braked.

On the rack side of the quadrant the lever is offset, as shown at L', said offset portion being bored to receive a spring pressed member M the outer end of which is tapered at opposite sides to provide a pair of oppositely disposed flat faces M'. At one side the offset lever portion L' extends beyond the end of the member M, to form an abutment portion $L^2$. It will be understood that the member M may be rounded at its end instead of being flattened as herein shown.

The handle portion H of the lever is provided with a comparatively wide lower portion H' which is bifurcated and straddles that portion of the lever L above the quadrant, said handle portion H' being pivoted to the lower portion L' in off-center relation to the shaft S, as indicated at P. The handle portion H' and lever portion L' are provided with abutment shoulders $H^3$ and $L^3$ respectively, which come into contact with each other, when the handle is moved toward the right as shown in Fig. 1, thus ensuring rigidity in applying the brake. The handle portion H' is bored at one side to provide a chamber or seat in which is mounted a spring pressed detent D, the lower end of which is in the form of a pawl adapted to engage the teeth of the quadrant. The handle portion H' is also bored at the side thereof opposite from the plunger D to form a seat for a member N which is threaded in said bore and tapered at its lower end to form flat faces N' adapted to cooperate with the faces M' of the member M as hereinafter more fully described.

Fig. 1 shows the device in the "on" position of the brake, with the lower end of the detent D in engagement with the quadrant. With the parts in the position shown, if it is desired to release the brake the handle H is pushed toward the left whereupon the flat face N' of the member N will slide on the face M' of the member M, thus exerting a cam action on said member and causing the same to move downward until the end of the member N passes over the end of the member M, thereby permitting the handle to swing on its pivot and release the detent D from the quadrant. Further swinging of the handle on its pivot is prevented by the contact of the shoulder $H^2$ of the handle portion with the abutment $L^2$ of the lever. When the lever comes to rest in the "off" position the flat sides M' and N' opposite from those shown in Fig. 1 will be in engagement, so that if the handle is moved toward the "on" position, or to the right, the member N again depresses the member M and slides over it, thus permitting the handle to swing on its pivot into quadrant engaging position.

Means is shown in Figs. 2 and 3 for locking the parts in the "on" position and preventing the handle from moving with relation to the lever. In these figures, the handle portion H' and the lever portion L' are cut away between the walls of the bifurcated portion of the handle to provide an L-shaped recess or chamber K' for the reception of a lug or key K carried at the lower end of a rod R mounted for sliding movement in the handle and provided at its upper end with an operating knob or handle R'. It will be readily seen that when the key K is in the upper part of the vertical portion of said chamber the handle cannot move toward the quadrant-releasing position, because the key will form a wedge in contact with both members H' and L' so that the member H' cannot be moved on its pivot to release the quadrant. However, when the key is moved to its lowermost position as shown in Fig. 2 the horizontal extension of the L-shaped chamber will permit movement of the handle portion H' toward the left of Fig. 2 without contacting with the key, thus releasing the detent D from the quadrant. For retaining the key in its raised position a spring-pressed ball $K^6$ is mounted in the wall of the handle portion and adapted to engage a depression $K^7$ formed in the stem of said key.

Figure 4:
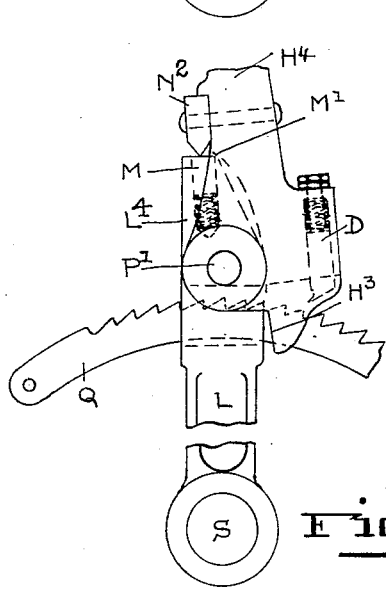
Fig. 4 is a broken away side view showing a modified form of brake operating mechanism, in the "off" position of the brake.
Figure 5:
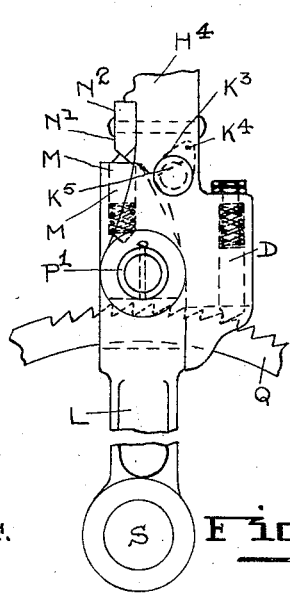
Fig. 5 is a side view of the mechanism shown in Fig. 4, illustrating it in the "on" position and provided with a modified form of means for locking it in said position.
Figure 6:
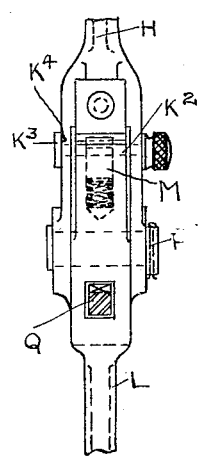
Fig. 6 is an elevation of the mechanism at right angles to Fig. 5 and showing the quadrant in section.

In the modification shown in Figs. 4, 5 and 6 the upper portion $L^4$ of the lever, instead of being offset as in Fig. 1, extends in a straight line with the lower portion and has mounted in its upper end a spring-pressed member M similar to that shown in Fig. 1. The handle portion $H^4$ is pivoted at P' to said lever in alinement with the shaft S, said handle having an offset portion in which is mounted a spring-pressed pawl D for engagement with the quadrant. The cam member $N^2$, in this form, is secured by a rivet or pin to the handle, the members M and $N^2$ being flattened at their ends for cooperation in the manner described in connection with Figs. 1 to 3. For locking the parts in the "on" position a pin $K^2$ is mounted for rotation in the handle, and is provided at one end with a knurled head for manually rotating it and at its opposite end with a spring catch $K^3$ adapted to enter a dent or dimple $K^4$ formed in the handle. The pin $K^2$ is cut away at one side thereof, as indicated at $K^5$ in Fig. 5. When the curved side of the pin is in engagement with the upper end of the lever the parts are locked or wedged against relative movement. However, when the pin is rotated until its cut away side is toward the lever it permits sufficient movement of the handle relative to the lever to release the quadrant.

Figure 7:
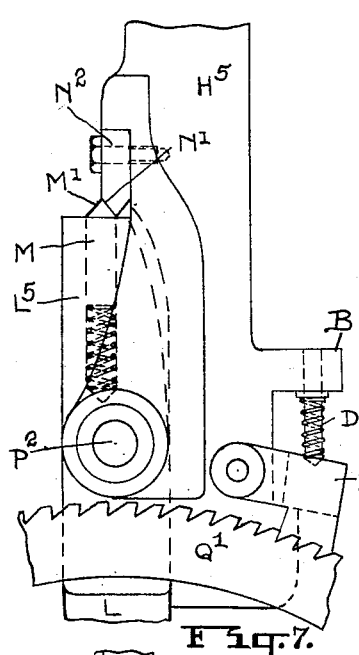
Figs. 7 and 8 are views respectively similar to Figs. 5 and 6, but illustrating a further modified form of mechanism.
Figure 8:
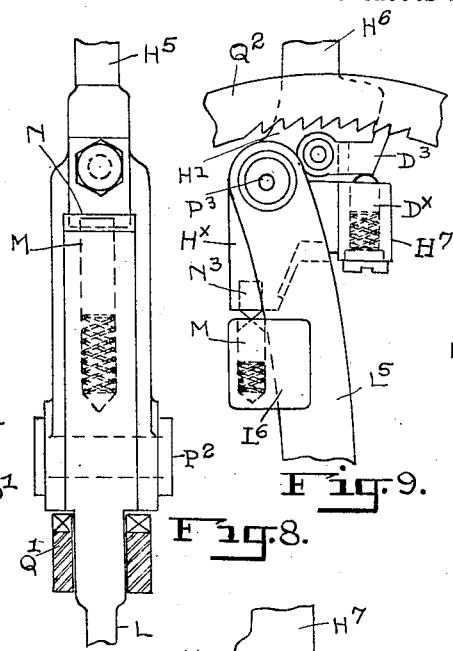

In Figs. 7 and 8 the lever mechanism is illustrated as applied to a quadrant Q' of the double type. In this form the upper part $L^5$ of the lever passes between the arms of the quadrant, the form of the lever above the quadrant being the same as that shown in Figs. 4–6. The handle portion $H^5$ in this case is pivoted at $P^2$ on the lever and carries a cam member $N^2$ cooperating with a spring-pressed member M carried by the lever, the handle being provided at one side of its pivot with a pivoted dog or detent D' normally urged into engagement with the quadrant by a coil spring $D^2$ mounted on a pin secured in a bracket B extending from the handle.

Figures 9, 10:
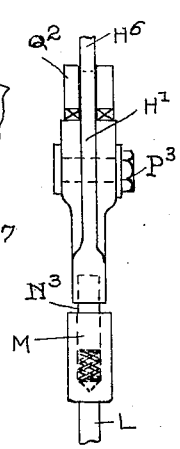
Figs. 9 and 10 are views similar to Figs. 5 and 6, but illustrating a still further modified form of mechanism.

In Figs. 9 and 10 the lever mechanism is shown applied to a double quadrant $Q^2$ racked at its underside. In this form the handle $H^6$ is pivoted to the lever at $P^3$ below the rack, the lever $L^5$ carrying a bracket $L^6$ in which the spring-pressed member M is mounted, while the handle is provided at one side of its pivot with an offset portion $H^x$ in which is mounted the cooperating cam member $N^3$, and at the opposite side of its pivot with a second offset portion $H^7$ carrying a detent $D^x$ for normally maintaining a pivoted pawl $D^3$ in engagement with the rack. In this form, as will be obvious from the drawing, movement of the handle on its pivot toward the right will release the pawl from the rack and will carry the cam member $N^3$ to the opposite side of the spring-pressed member K, and when the brake is to be applied the handle is thrown toward the left of Fig. 9 whereupon the engagement of members M and $N^3$ will offer only enough resistance to cause the handle $H^6$ to move independently of the lever sufficiently far to apply the brake.

Figure 11:
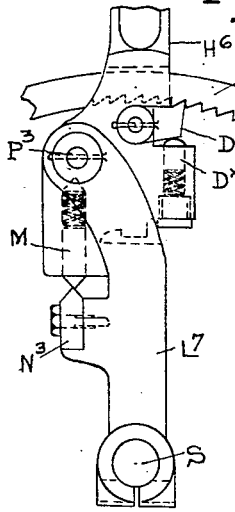
Figs. 11 and 12 are views similar to Figs. 5 and 6 but illustrating a further modified form.
Figure 12:
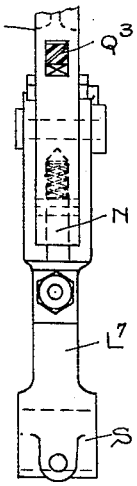

The mechanism shown in Figs. 11 and 12 is similar to that of Figs. 9 and 10. The quadrant $Q^3$, however, is of the single type, racked at its underside, and passes through the lever $L^7$. In this form also, the handle carries the movable cam member M while the fixed cooperating member $N^3$ is secured to the lever member $L^7$. The action of these members, however, is identical with the corresponding members hereinbefore described.

Figure 13:
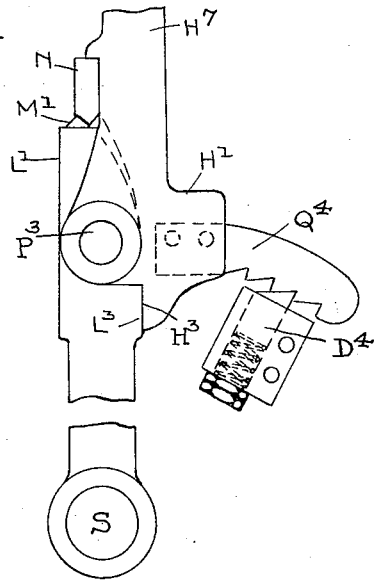
Fig. 13 is a side view illustrating another modified form of mechanism.

Fig. 13 discloses a form in which the racked quadrant $Q^4$ is secured to the handle portion $H^7$ and the teeth of the rack cooperate with a spring-pressed detent or pawl $D^4$ secured on a fixed portion of the vehicle body. The disposition of the cooperating cam members M and N is practically identical with that shown in Figs. 4 to 8 inclusive.

In Figs. 14 to 17, I have illustrated the features of the invention applied to a mechanism suitable for railroad brakes. In this form the brake lever $L^8$ is pivoted at $P^4$ to a box-like portion $H^8$ of a handle $H^9$, said handle being broken away in Figs. 14 and 15. On the pivot $P^4$ is also mounted within the handle portion $H^8$ a detent member $D^5$ having at one end a pawl $D^6$ adapted to engage a fixed rack $Q^5$. Within the boxlike handle portion $H^8$ is pivotally mounted a member $N^4$ having a cam portion $N^5$ adapted to cooperate with a similarly formed member $M^4$ secured on the inner end of the lever $L^8$. A coil spring A is secured at one end to the free end of the member $N^4$ and at its opposite end to the end of the detent $D^5$ opposite from the pawl, as indicated at A' and $A^2$ respectively. The spring A thus normally maintains the cam members $N^5$ and $M^4$ in contact and also constantly urges the pawl $D^6$ toward its cooperating rack. With the parts in the position shown in Fig. 14 the brake is in the "on" position. It will readily be seen that if the handle is tilted to the position shown in Fig. 15 the cam member $N^5$ will pass over the end of the member $M^4$ and in doing so will exert enough pressure on said member $M^4$ in the upward direction to move the lever $L^8$ on its pivot to a sufficient degree to release the brake. During this movement, as soon as the highest points of members $N^5$ and $M^4$ have passed each other the pawl $D^6$ begins to disengage from the rack this disengagement being assisted by the engagement of said pawl by a projection $H^{10}$ of the housing and which projection serves also to limit relative motion between the lever and handle in the opposite direction, by contacting with the lower edge of the lever, as shown in Fig. 14.

It would be possible to multiply almost indefinitely the varieties of form which may be given applicant's device in order to adapt it for special uses. It is believed, however, that the foregoing is sufficient to convey the fact that whatever form the mechanism may take, the characteristic features of applicant's invention are present, namely a two-part lever, the parts of which are pivotally connected together and cooperate with a pawl and ratchet mechanism in such a manner that while the brake is securely held in the "on" position it is releasable by a direct movement of the lever in the direction of release. Moreover, it will be observed that by the provision of the cooperating adjustable and spring actuated cam members herein described the restricted relative movements of the parts of the lever may be calculated and adjusted to correspond with the degree of brake pressure desired.

It will be noted that in some instances the spring cam member is shown carried by the lever portion proper and the fixed cooperating member by the handle portion, while in other instances the disposition of these members is reversed. It is therefore to be understood that the scope of the invention is not in any way limited by the particular disposition of these members.

What I claim is:

1. A brake-operating mechanism, comprising in combination, a brake shaft, a lever secured to said shaft, a rack member, yielding means for engaging said rack member thereby to retain the lever in brake-setting position, a handle pivoted to said lever for independent movement thereby to actuate said brake-retaining means, yieldable means between said lever and handle and normally opposing independent movement of the handle, means operative during a part of the actuation of the handle in either direction to compress said yieldable means thereby to permit such independent movement, and means for limiting said movement.

2. A brake-operating mechanism, comprising in combination, a brake shaft, a lever secured to said shaft, a rack member, yielding means for engaging said rack member thereby to retain the lever in brake-setting position, a handle pivoted to said lever for independent movement thereby to actuate said brake-retaining means, said lever and handle carrying one a yieldable member normally opposing independent movement of the handle and the other a fixed member operative during a part of the actuation of the handle in either direction to compress said yieldable member thereby to permit such independent movement, and means for limiting said movement.

3. A brake-operating mechanism, comprising in combination, a brake shaft, a lever secured to said shaft, a rack member, yielding means for engaging said rack member thereby to retain the lever in brake-setting position, a handle pivoted to said lever for independent movement thereby to actuate said brake-retaining means, said lever and handle carrying one a yieldable member normally opposing independent movement of the handle and the other an adjustably fixed member operative during a part of the actuation of the handle in either direction to compress said yieldable member thereby to permit such independent movement, and means for limiting said movement.

4. A brake-operating mechanism, comprising in combination, a brake shaft, a lever secured to said shaft, a rack member, yielding means for engaging said rack member thereby to retain the lever in brake-setting position, a handle pivoted to said lever for independent movement thereby to actuate said brake-retaining means, a spring-pressed member mounted in said lever, a fixed member carried by said handle in contact with said spring-pressed member thereby normally to oppose independent movement of the handle, said fixed member being adapted to compress said spring-pressed member during a part of the actuation of the handle in either direction thereby to permit such independent movement, and means for limiting said movement.

5. A brake-operating mechanism, comprising in combination, a brake shaft, a lever secured to said shaft, a rack member, yielding means for engaging said rack member thereby to retain the lever in brake-setting position, a handle pivoted to said lever for independent movement thereby to actuate said brake-retaining means, said lever and handle carrying one a yieldable member having a pair of oppositely disposed cam faces and the other a fixed member having a pair of similar cam faces, a cam face of one of said members being constantly in engagement with a cam face of the other member thereby normally to oppose independent movement of the handle but to compress said yieldable member during a part of the actuation of the handle in either direction thereby to permit such independent movement, and means for limiting said movement.

In testimony whereof I have signed my name to this specification.

WILLIAM HEARFIELD SMITH.